United States Patent [19]

Murayama

[11] Patent Number: 4,760,758
[45] Date of Patent: Aug. 2, 1988

[54] TRANSMISSION SYSTEM FOR VEHICLE HAVING PLANETARY GEAR TYPE FORWARD AND BACKWARD DRIVE SWITCHING APPARATUS

[75] Inventor: Yoshinobu Murayama, Osaka, Japan

[73] Assignee: Kubota, Ltd., Osaka, Japan

[21] Appl. No.: 906,236

[22] Filed: Sep. 10, 1986

[30] Foreign Application Priority Data

Sep. 11, 1985 [JP] Japan .................. 60-200978
Sep. 11, 1985 [JP] Japan .................. 60-200979

[51] Int. Cl.$^4$ ............................ F15H 57/10
[52] U.S. Cl. .......................... 74/764; 74/788; 74/792; 192/87.17
[58] Field of Search ............. 192/4 C, 18 A, 87.17, 192/87.18; 188/72.4, 366, 367; 74/764, 740, 788, 792, 681, 674

[56] References Cited

U.S. PATENT DOCUMENTS

| | | | |
|---|---|---|---|
| 733,076 | 7/1903 | Nye et al. ...................... | 74/764 |
| 2,159,326 | 5/1939 | Harwood et al. ............... | 192/18 A |
| 2,251,625 | 8/1941 | Hale ............................... | 74/764 X |
| 2,436,968 | 3/1948 | Longfield ....................... | 192/18 A |
| 2,445,573 | 7/1948 | Godbe, Jr. ...................... | 74/764 |
| 3,020,990 | 2/1962 | Liu ................................. | 74/764 X |
| 3,407,677 | 10/1968 | Troeger ......................... | 74/764 X |
| 3,469,664 | 9/1969 | Ortlinghaus et al. ........... | 192/18 A |
| 3,727,731 | 4/1973 | Selig .............................. | 192/18 A |
| 3,853,210 | 12/1974 | Kitano et al. .................. | 192/4 C |
| 3,886,816 | 6/1975 | De Feo et al. ................. | 74/764 |
| 4,044,869 | 8/1977 | Gros .............................. | 192/87.17 X |
| 4,208,923 | 6/1980 | Ikegami ......................... | 74/15.63 |
| 4,498,356 | 2/1985 | Vater et al. .................... | 74/15.63 X |

FOREIGN PATENT DOCUMENTS

| | | | |
|---|---|---|---|
| 451511 | 9/1948 | Canada ........................... | 192/87.18 |
| 21406 | 5/1956 | Fed. Rep. of Germany ..... | 74/15.69 |
| 2141739 | 3/1973 | Fed. Rep. of Germany ... | 192/18 A |
| 58-36651 | 3/1983 | Japan . | |
| 609732 | 10/1948 | United Kingdom ............. | 192/87.18 |
| 609735 | 10/1948 | United Kingdom ............. | 192/87.18 |
| 887756 | 1/1962 | United Kingdom ............. | 74/788 |

Primary Examiner—Leslie A. Braun
Assistant Examiner—Dwight G. Diehl
Attorney, Agent, or Firm—Gifford, Groh, VanOphem, Sheridan, Sprinkle and Dolgorukov

[57] ABSTRACT

A planetary gear type forward and backward drive switching apparatus, comprising a sun gear mounted on an input transmission shaft, a carrier mounting planetary gears meshing the sun gear and rotatable about the transmission shaft, a ring gear meshing the planetary gears and rotatable about the transmission shaft, and a friction brake mechanism for selectively braking rotations of the carrier and the ring gear, including a ring-formed main brake body having braking faces for acting on side faces of the carrier and the ring gear, the main brake body being shiftable axially of the transmission shafts for selectively braking the carrier and the ring gear, a clutch mechanism for selectively transmitting rotational outputs of the carrier and the ring gear to an output transmission shaft, and a control lever for controlling the forward and backward drive switching apparatus.

According to this planetary gear type forward and backward drive switching apparatus, the control lever provides a forward drive by braking the ring gear and at the same time by operatively connecting the carrier to the output transmission shaft and provides a backward drive by braking the carrier and at the same time by operatively connecting the ring gear to the output transmission shaft.

17 Claims, 7 Drawing Sheets

TRANSMISSION SYSTEM FOR VEHICLE HAVING PLANETARY GEAR TYPE FORWARD AND BACKWARD DRIVE SWITCHING APPARATUS

BACKGROUND OF THE INVENTION

1. Field of the Invention

This invention relates to a planetary gear type forward and backward drive switching apparatus for a vehicle comprising first and second running line transmission shafts for transmitting output of an engine to running means disposed coaxially each other, a sun gear mounted on the first running line transmission shaft, a carrier mounting planetary gears meshing the sun gear and rotatable about the transmission shafts, a ring gear meshing the planetary gears and rotatable about the transmission shafts, and friction brake means for selectively braking rotations of the carrier and the ring gear, and clutch means for selectively transmitting rotational outputs of the carrier and the ring gear to the second transmission shaft, and more particularly to said apparatus included in a transmission system having a main transmission, an auxiliary transmission, an axle transmission mechanism and power takeoff means.

This forward and backward drive switching apparatus is adapted for selectively transmitting a rotational power of the sun gear to the running line transmission shaft in a normal rotation or in a reverse rotation through braking switching operations by the friction brake mechanism and engagement switching operations by the clutch mechanism.

2. Description of the Prior Art

This type of forward and backward drive switching apparatus is disclosed, for example, in a Japanese utility model application published or laid open for public inspection under No. 58-36651. According to the disclosed arrangement, the friction brake unit is disposed between peripheral faces of the ring gear and the carrier such that the brake as a whole selectively acts on an inner peripheral face of the ring gear and an outer peripheral face of the carrier. This arrangement has disadvantages to be described hereinafter.

If the brake as a whole has to act on the overall or substantially overall peripheral faces of the ring gear and the carrier in order to obtain a secure braking effect, it is necessary to adapt the main brake body to variably have a large radius and a small radius to respectively act on one or the other of the ring gear and the carrier. Thus, the main brake body need be structurally complicated including a large number of parts.

Moreover, the simplification of the structure and the minimization of the occupying space are requisite for accommodating this type of forward and backward drive switching apparatus in the transmission system including the main transmission, the auxiliary transmission, the axle transmission mechanism and the power takeoff means. Also, it is needless to say that the structures and arrangements of the main transmission, the auxiliary transmission, the axle transmission mechanism and the power takeoff means must be improved in order to form the system as a whole compact.

SUMMARY OF THE INVENTION

Accordingly, it is the object of the present invention to overcome the drawbacks of the prior art and to provide a planetary gear type forward and backward drive switching apparatus having a compact construction and more particularly friction brake means for the carrier and the ring gear simple in construction and sure in effect, and further to form compact the overall transmission system for a vehicle accommodating this apparatus.

The foregoing objects and accomplished in one embodiment by providing a planetary gear type forward and backward drive switching apparatus comprising first and second transmission shafts for transmitting output of an engine to running means disposed coaxially with each other, a sun gear mounted on the first running line transmission shaft, a carrier mounting planetary gears meshing the sun gear and rotatable about the transmission shafts, a ring gear meshing the planetary gears and rotatable about the transmission shafts, and friction brake means for selectively braking rotations of the carrier and the ring gear including a ring-formed main brake body having braking faces for acting on side faces of the carrier and the ring gear, the main brake body being shiftable axially of the transmission shafts for selectively braking the carrier and the ring gear, clutch means for selectively transmitting rotational outputs of the carrier and the ring gear to the second transmission shaft, and control means for controlling the forward and backward drive switching apparatus, wherein the control means provides a forward drive by braking the ring gear and at the same time by operatively connecting the carrier to the second transmission shaft and provides a backward drive by braking the carrier and at the same time by operatively connecting the ring gear to the second transmission shaft. Further, in order to form compacty the overall construction of the transmission system mounting this forward and backward drive switching apparatus, a front end portion of a rear power takeoff shaft receiving the rotational output of the second running line transmission shaft is connected to a pinion gear of the differential mechanism and the auxiliary transmission unit is disposed rearwardly of the differential mechanism and in the region accommodating the second running line transmission shaft and the power takeoff shaft.

Other and further objects, features and advantages of the invention will appear more fully from the following description.

BRIEF DESCRIPTION OF THE DRAWINGS

FIG. 6-a is a sectional side view showing a front portion of another embodiment of the transmission system for a vehicle having a planetary gear type forward and backward drive switching apparatus according to the present invention, FIG. 6-*b* is a sectional side view of a rear portion of the same, and

DESCRIPTION OF THE PREFERRED EMBODIMENTS

Figure 1:
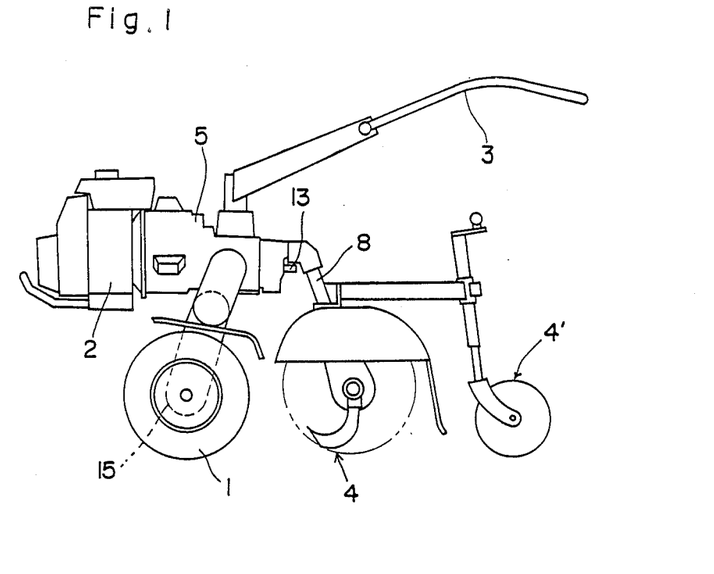
FIG. 1 shows a walking type tiller mounting a transmission system for a vehicle having a planetary gear type forward and backward drive switching apparatus according to the present invention, FIG. 2-a is a sectional side view showing a front portion of the same, FIG. 2-b is a sectional side view showing a rear portion of the same.

As shown in FIG. 1, a running type tiller comprises an automotive body including right and left wheels 1, 1, an engine 2, a steering handle 3 and the like and connecting at a rear portion thereof a rotary plow 4 such that power is transmitted from the automotive body to the rotary plow 4. A reference numeral 4′ denotes a tailing wheel for adjusting a plowing depth.

Figure 2A:
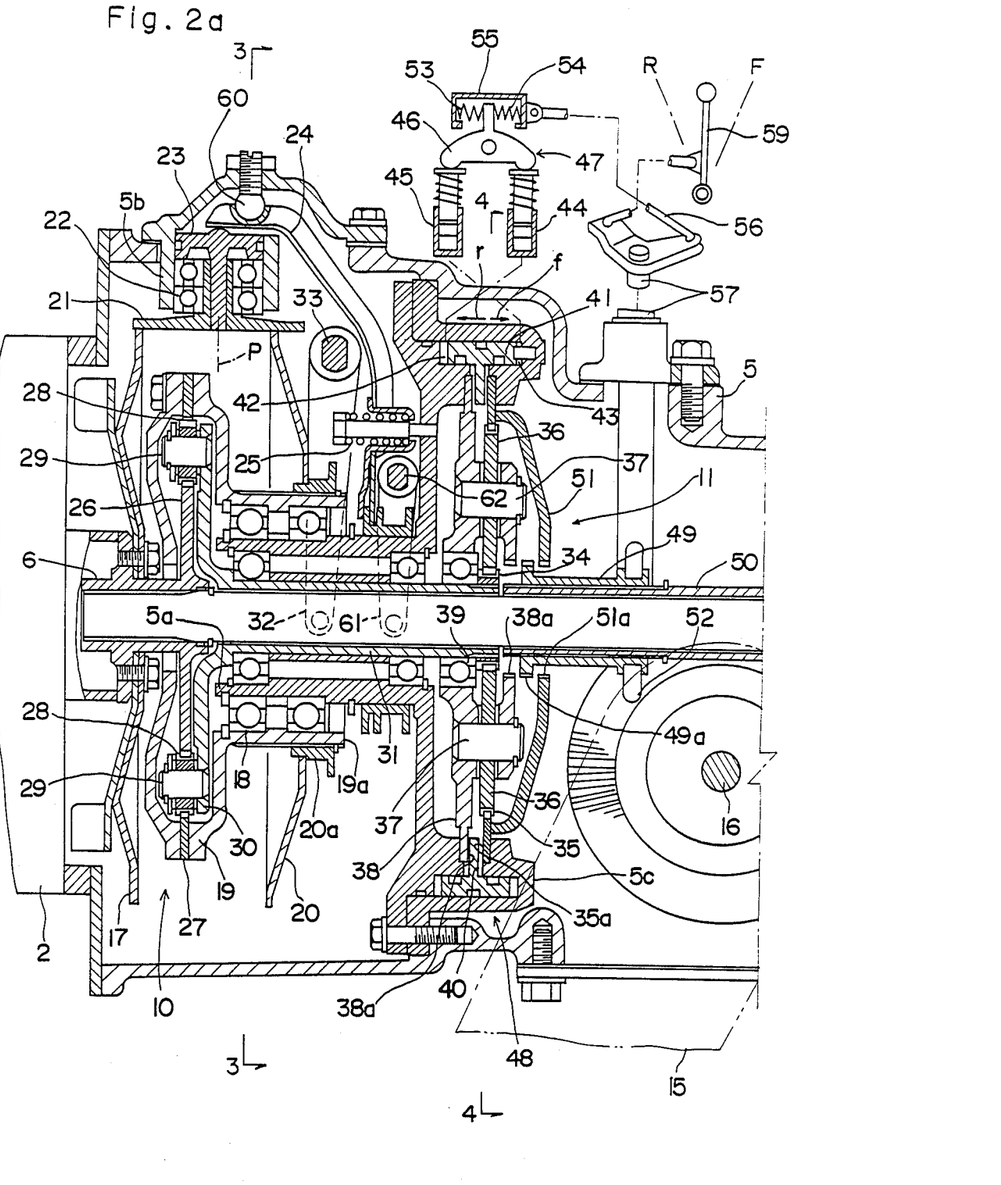
Figure 2B:
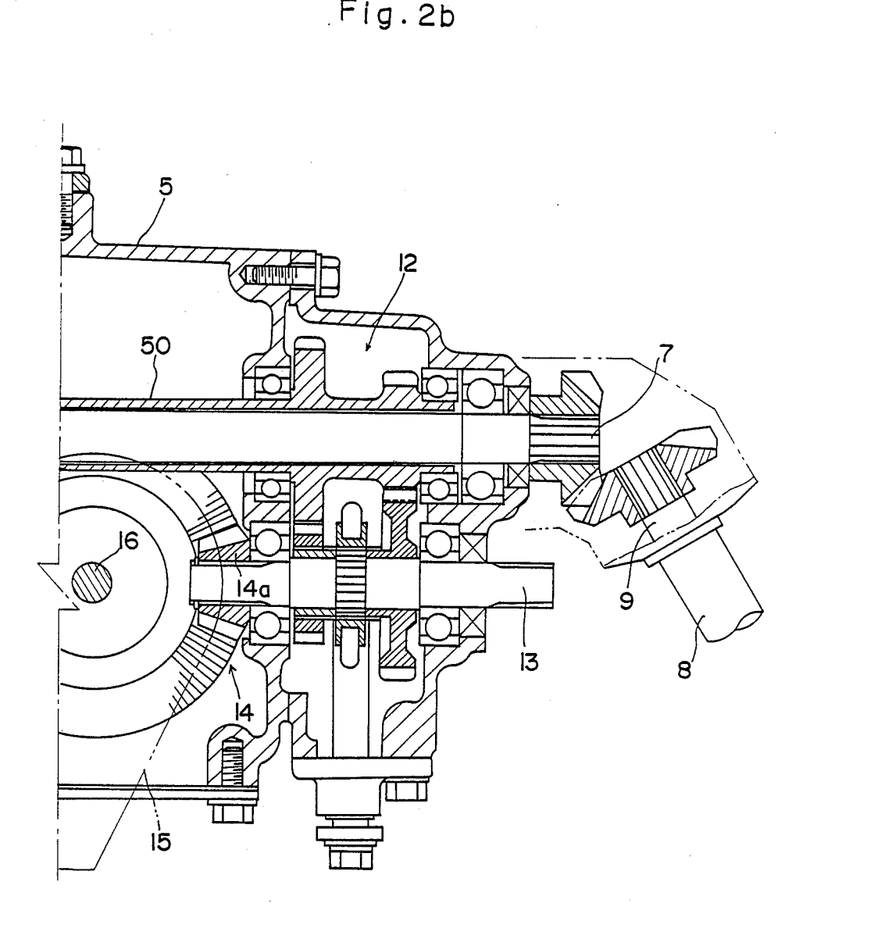

FIGS. 2-*a*, 2-*b* illustrate a transmission structure for transmitting output of the engine 2 to the wheels 1 and to the rotary plow 4.

That is to say, an input shaft 6 extending toward a transmission system is operatively connected to the engine 2. This input shaft 6 is further operatively connected through a first power takeoff shaft 7 to an input shaft 9 of a rotary plow transmission case 8 of the rotary plow 4, whereby rotational power of the input shaft 6 is transmitted to a main transmission unit 10. Thereafter, rotational output of this main transmission unit 10 is transmitted through a first running line transmission shaft 31, a planetary gear type forward and backward drive switching apparatus 11 and an auxiliary transmission unit 12 for selectively providing high and low two speeds and then to a third running line transmission shaft 13 which acts also as a second power takeoff shaft. This third transmission shaft 13 is operatively connected through a pinion gear 14a provided in a front end region thereof and through a bevel gear transmission mechanism 14 to an output shaft 16 extending toward and transmission case 15 for the wheels.

The main transmission unit 10 is constructed as described hereinafter.

Figure 3:
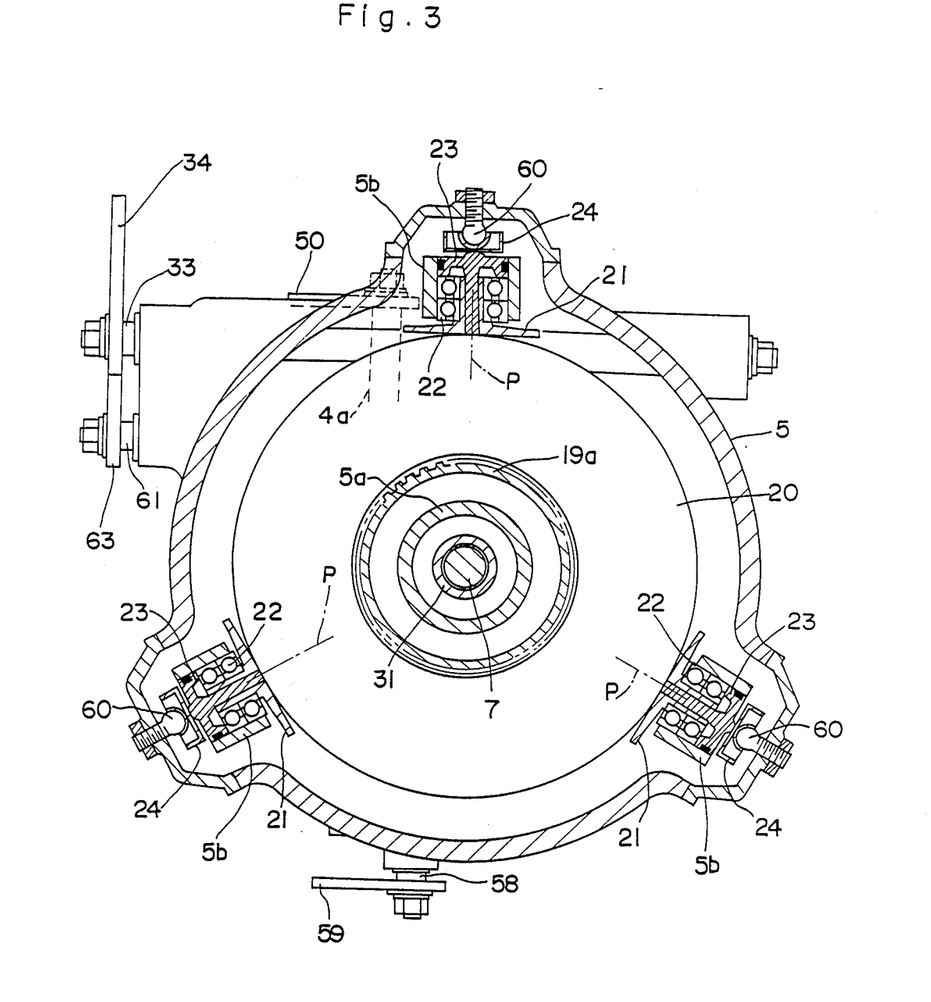
FIG. 3 is a view taken along the plane III—III of FIG. 2-a.

That is, the input shaft 6 bolt-connects a drive disk 17 to be rotatable in unison therewith. A driven disk 20 is freely rotatably mounted through a bearing 18 and a boss 19a of a ring gear support member 19 on a cylindrical boss 5a of a transmission case 5. Referring to FIG. 3, a plurality of transmission disks 21 . . . interspersed along an outer periphery of the disks 17 and 20 are respectively connected through bearings 22 into a cylindrical boss 5b of the transmission case 5 and at the same time urged through the bearings 22, a piston 23 and a link 24 by means of a spring 25 to contact edge faces of the disks 17 and 20. The transmission disks 21 are respectively frictionally rotated about an axis 'P' by rotation of the drive disk 17 and rotational outputs of these transmission disks 21 are frictionally transmitted to rotate the driven disk 20 coaxially with the input shaft 6 in the opposite direction thereto. The ring gear support member 19 is rotatable in unison with the driven disk 20 with the boss 19a spline-connected to a mounting portion 20a for mounting the driven disk 20 to the ring gear support member 19. The input shaft 6 integratedly carries thereon a sun gear 26 to be rotatable in unison togetherwith. Each of a plurality of planetary gears 28 . . . respectively in mesh with the sun gear 26 and the ring gear 27 attached to the ring gear support member 19 to be rotatable in unison therewith is mounted through a support shaft 29 to a carrier 30 which is connected to a first running line transmission shaft 31 formed as a hollow shaft to be rotatable in unison whereby a rotational output of the driven disk 20 is transmitted by a relative rotation between the ring gear 27 and the sun gear 26 and by actions of the planetary gears 28 to the first running line transmission shaft 31. At the boss 19a, splined to the mounted portion 20a, the transmission disks 21 are radially slid by means of a rocking shifter 32.

In short, the rotaional output of the input shaft 6 is frictionally transmitted to the first running line transmission shaft 31 and at the same time a rotational operation of a rotational support shaft 33 for the shifter 32, slides the driven disk 20 whereby the driven disk 20 is shifted into a different postition to contact the transmission disks 21, the rotational speed of the driven disk 20 is changed and also a rotational speed ratio between the ring gear 27 and the sun gear 26 is changed and consequently the rotational speed of the first running line transmission shaft 31 steplessly varies in a range between zero and a predetermined value.

Further, in order to obtain a clutching function for the main transmission unit 10, a link 24 is oscillatable about a functioning portion of a suport shaft 60 and a rocking shifter 61 is provided for releasing the pressure contact between the transmission disks 21 and the drive disk 17 or the driven disk 20 by the urging force of the spring 25.

More particularly, a rotational operation of a lever 63 attached to the rotational shaft 62 of the shifter 61 to be rotatable in unison therewith selectively provides the pressure contact state and the pressure contact released state between the transmission disks 21 and the drive disk 17 or the driven disk 20 whereby the power transmission between the drive disk 17 and the driven disk 20 is carried out or broken. This clutching function is necessary for a switching operation between the forward and backward drive switching apparatus 11 and the auxiliary transmission unit 12.

The forward and backward drive switching apparatus 11 will be more particularly described hereinafter.

Figure 4:
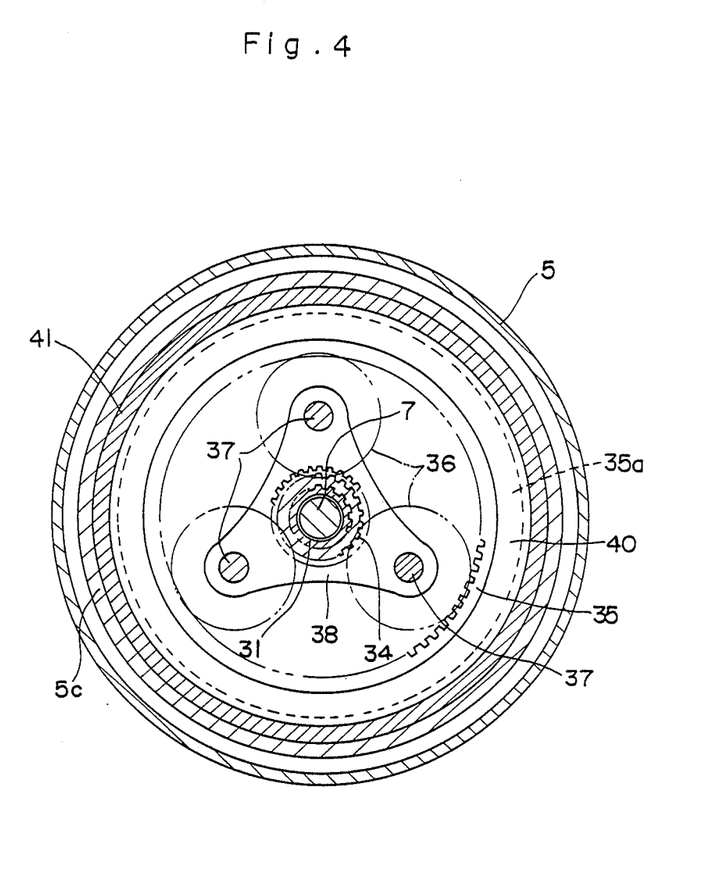
FIG. 4 is a view taken along the plane IV—IV of FIG. 2-a.

A sun gear 34 is mounted on an end portion of the first running line transmission shaft 31 to be rotatable in unison therewith and driven thereby. A ring gear 35 is mounted at a transmission case portion 5c to be rotatable about an axis of the first running line transmission shaft 31. A carrier 38 mounting through support shafts 37 a plurality of planetary gears 36 . . . respectively meshing the sun gear 34 and the ring gear 35 is mounted through a bearing 39 on the first running line transmission shaft 31 to be rotatable relative thereto. A main brake body 40 for the ring gear 35 and the carrier 38 formed as a single ring as shown in FIG. 4, is mounted at the transmission case portion 5c with its inner periphery disposed between a side face 35a of the ring gear 35 and a side face 38a of the carrier 38. A control mechanism 47 comprising a hydraulic piston 41 defined in the main brake body 40, a pair of pumps 44, 45 for respectively providing oil to a first oil chamber 42 and to a second oil chamber 43 and a rocking control member 46 for controlling these pumps 44, 45 shifts the main brake body 40 toward the respective rotational axis of the ring gear 35 and the carrier 38 thereby to selectively brake the ring gear 35 and the carrier 38. Thus is constructed friction brake means 48 for transmitting the rotational output of the sun gear 34 selectively to the ring gear 35 and to the carrier 38. More particularly, an operation of the pump 44 feeds oil into the first oil chamber 42 to move the hydraulic piston 41 in a direction 'f' indicated by an arrow to urge the main brake body 40 against the side face 35a of the ring gear 35 and the ring gear 35 alone is prevented from its rotation by its pressure contact with a transmission case portion 5c, while the carrier 38 is rotated in the same direction as the sun gear 34. On the other hand, an operation of the other pump 45 feeds oil into the second oil chamber 43 to move the hydraulic piston 41 this time in a direction 'r' indicated by an arrow to urge the main brake body 40 against the side face 39a of the carrier 39 and the carrier 38 alone is prevented from its rotation by its pressure contact with the transmission case portion 5c whereby with a reversing transmission action of the planetary gears 36 the ring gear 35 is rotated in the opposite direction to the sun gear 34. A sleeve type clutch 49 spline-connected to a second running line transmission shaft 50 formed as a hollow shaft to be rotatable in unison therewith and slidable thereon, is slided by means of an oscillating type shifter 52 such that a spline portion 49a defined on the second running line transmission shaft 50 engages a spline 38b of the carrier 38 thereby to operatively connect the carrier 38 to the second running line transmission shaft 50 and such that the spline portion 49a engages a spline 51a of a transmission disk 51 attached to the ring gear 35 rotatably in unison togetherwith thereby to operatively connect the ring gear 35 to the second running line transmission shaft 50.

In short, when a forward and backward drive switching lever 59 operatively connected to the control member 46 through springs 53 and 54 and interlocking members 55, 56 and also operatively connected to a rotational support shaft 57 of the shifter 52 through a link mechanism 58 is shifted into a first position 'F', the ring gear 35 is braked and at the same time the carrier 38 is operatively connected to the second running line transmission shaft 50 whereby the rotational output of the sun gear 34 is transmitted in the normal direction to the second running line transmission shaft 50 for the forward drive. On the other hand, when the forward and backward drive switching lever 59 is shifted into a second position 'R', the carrier 38 is braked and at the same time the ring gear 35 is operatively connected to the second running line transmission shaft 50 whereby the rotational output of the sun gear 34 is transmitted in the reverse direction to the second running line transmission shaft 50 for the backward drive.

According to the friction brake means constructed as described above, by shifting the main brake body in the direction of the axis of the transmission shafts, the braking power acts on the respective, overall or substantially overall peripheral faces of the ring gear and the carrier, whereby a more secure braking of the ring gear and the carrier and also a power transmission without slipping power loss have become possible.

Further, this construction permits the main brake body to comprise a single unit having a simple construction.

Other embodiments of the friction brake means 48 will be described next. The braking faces of the main brake body 40 may be formed of peripherally partial ones having slits by a certain pitch instead of comprising the single-ring type. Further, instead of the hydraulic type, the control mechanism for the main brake body may be of a type in which the manual controlling force is mechanically transmitted to the main brake body.

Also, as for the clutch means for selectively transmitting the rotational outputs of the carrier and the ring gear to the second running line transmission shaft 50, in order to automatize the selective connections between the carrier 38 and the second running line transmission shaft 50 and between the ring gear 35 and the second running line transmission shaft 50, a pair of unidirectional clutches, which transmission rotation directions are adapted to be opposed to each other, may be employed, instead of the sleeve type clutch.

The first power takeoff shaft 7 is formed as a shaft positioned inwardly of the hollow first and second running line transmission shafts 31, 50.

Figure 6A:
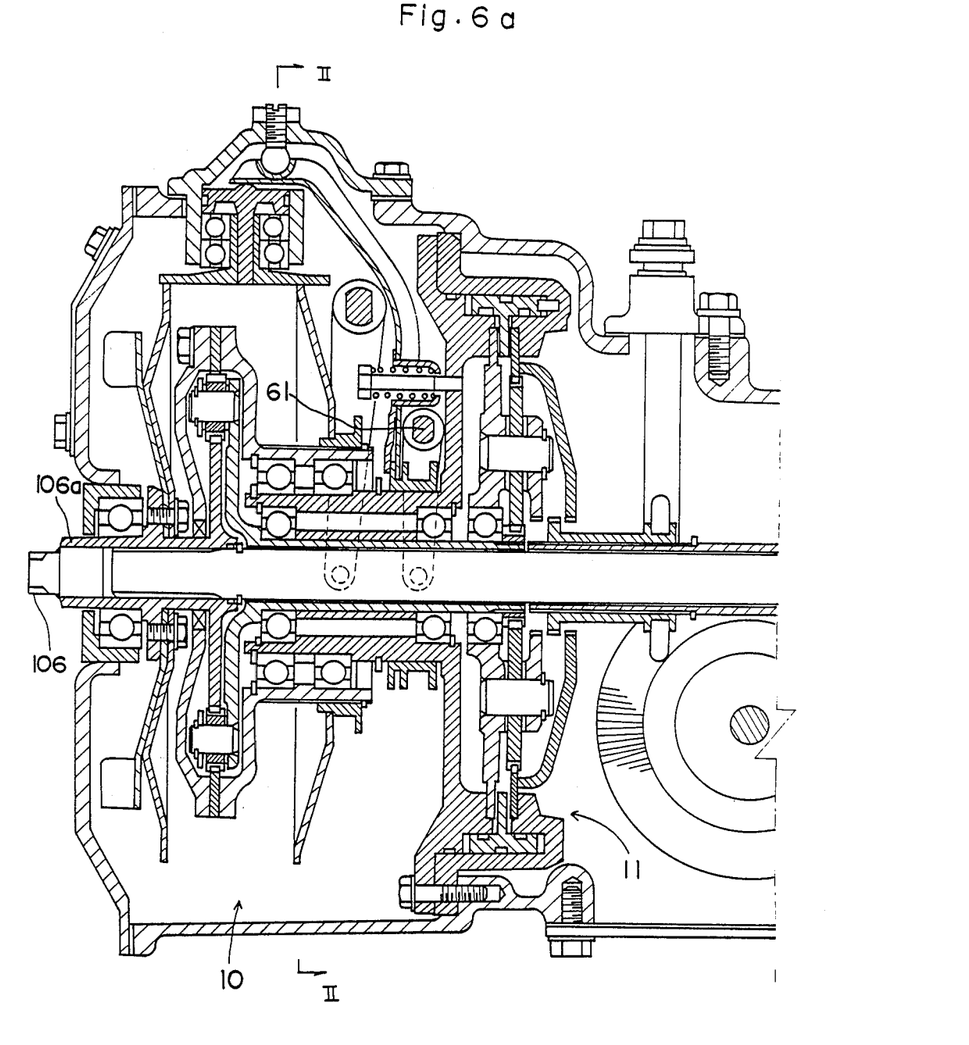
Figure 6B:
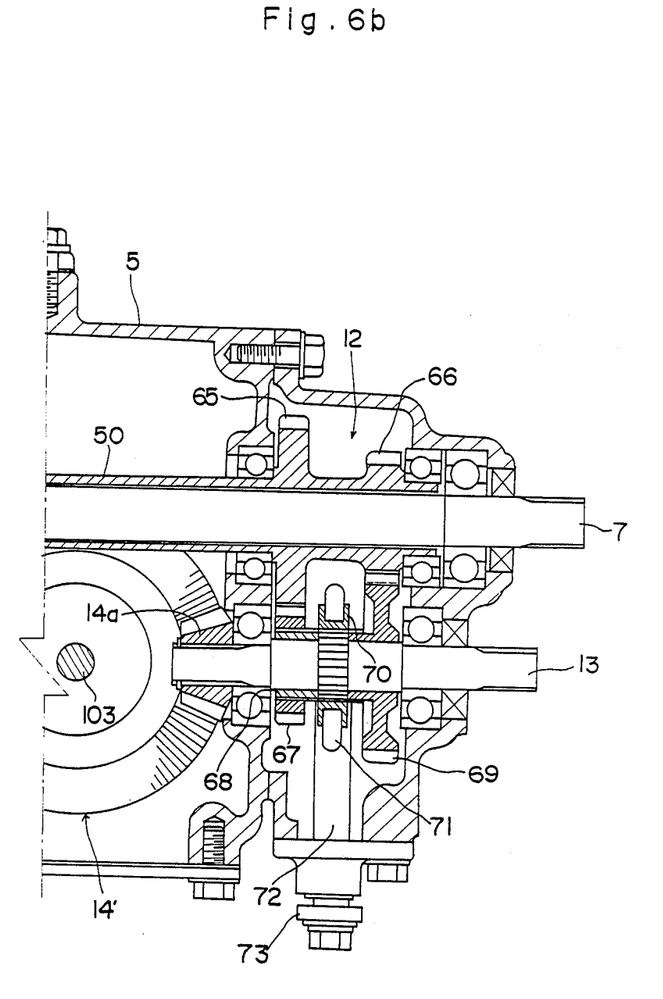

The construction of the auxiliary transmission unit 12 will be particularly described next. Referring to FIG. 6b, the second running line transmission shaft 50 integratedly carries thereon first and second drive gears 65 and 66 to be rotatable in unison therewith. The second power takeoff shaft 13 carries thereon to be rotatable relative thereto a spline sleeve 68 engaging an inner spline of a first driven gear 67 in mesh with the first drive gear 65 and a second driven gear 69 in mesh with the second drive gear 66. The second power takeoff shaft 13 further splines a change speed wheel member 70 acting as a clutch member of the auxiliary transmission unit 12 to be rotatable relative thereto and slidable thereon by means of an oscillating type shifter 71, whereby an oscillating operation of a change speed lever 73 attached to a rotational support shaft 72 of the shifter 71 causes the change speed wheel member 70 to engage the spline sleeve 68 rotated in unison with the first driven gear 67 to provide a low speed and causes the change speed wheel member 70 to engage the second driven gear 69 to provide a high speed.

In the aforementioned embodiment, the transmission system according to the present invention is mounted on the walking type tiller. Hereinafter will be described an overall construction of the same system embedded in an agricultural tractor with reference to FIGS. 5, 6-a, 6-b.

Figure 5:
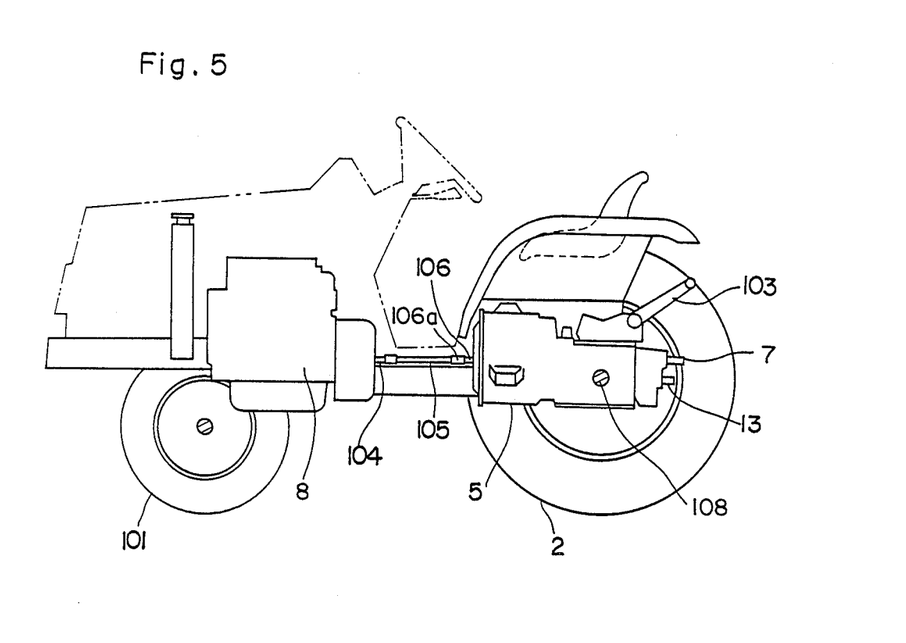
FIG. 5 shows an agricultural tractor mounting the transmission system for a vehicle having a planetary gear type forward and backward drive switching apparatus according to the present invention.

Referring to FIG. 5, an agricultural tractor comprises a vehicle body including right and left dirigible and freely rotatable front wheels 101, 101, right and left dirigible rear wheels 102, 102 and including at a rear portion thereof a lift arm 103 connected thereto for lifting and lowering various work implements such as a rotary plow and the first and second power takeoff shafts 7, 13. As shown in FIGS. 5 and 6-a, an engine 8 is connected through an engine output shaft 104 and an intermediate shaft 105 to an input shaft 106 of the transmission system. This input shaft 106 is connected through an input sleeve 106a fixed thereto to the main transmission 12.

Referring now to FIG. 6-b, the first power takeoff shaft 7 is attached to a transmission case 5 at a higher position than right and left rear axles 108, 108 attached to a transmission case 5 forming a rear portion of the vehicle body. The second power takeoff shaft 13 is attached to the transmission case 5 rearwardly of the axles 108. The second power takeoff shaft 13 acts also as the third running line transmission shaft for transmitting rotational output through the pinion gear 14a disposed at the front end portion thereof and the differential mechanism 14' to the rear axles 108.

I claim:
1. A planetary gear type forward and backward drive switching apparatus for a vehicle comprising;
   a first and second propelling line transmission shaft mounted coaxially for transmitting output of an engine to means for running the vehicle;
   a sun gear mounted on the first propelling line transmission shaft;
   a carrier supporting a plurality of planetary gears meshing with said sun gear, and rotatable about said first and second transmission shafts;

a ring gear meshing with said plurality of planetary gears and rotatable about said first and second transmission shafts, means for selectively frictionally braking said carrier and said ring gear, the means for braking including;

an annular main brake body having at least one braking face for acting on said carrier and said ring gear, said main brake body being shiftable axially along said first and second transmission shafts for selectively braking said carrier and said ring gear, and brake trigger means for operating the main brake body, clutch means including a main clutch body having an engaging member for selectively transmitting rotational outputs of said carrier and said ring gear to said second transmission shaft said clutch means further including a clutch trigger for operating said clutch body, and a forward and backward drive switching lever for operating the forward and backward drive switching apparatus, wherein said forward and backward switching lever is operatively connected to said brake trigger means and clutch trigger means, said brake trigger means acting on said main brake body so as to brake said ring gear, and said clutch trigger means concurrently acting on said main clutch body so as to operatively connect said carrier to said second transmission shaft in response to a displacement of said forward and backward drive switching lever, as a result of which a forward drive is produced, and said brake trigger means acting on said main brake body so as to brake said carrier, and said clutch trigger means acting on said main clutch body so as to operatively connect said ring gear to the second transmission shaft in response to another displacement of said forward and backward drive switching lever, as a result of which a backward drive is produced.

2. An apparatus as claimed in claim 1 wherein said carrier and ring gear each include a peripheral outer configuration substantially equidistant from an axis of the transmission shafts and arranged side by side axially along said transmission shafts, said main brake body being disposed between said carrier and said ring gear.

3. A planetary gear type forward and backward drive switching apparatus, as defined in claim 2, wherein:

said brake means further including;

a hydraulic piston integratedly attached to said main brake body, first and second oil chambers for said hydraulic piston, and a hydraulic control mechanism for supplying said first and second oil chambers with oil to shift said hydraulic piston.

4. A planetary gear type forward and backward drive switching apparatus, as defined in claim (3), wherein said hydraulic control mechanism includes first and second pumps respectively connected to said first and second oil chambers and said brake trigger means including a rocking type pump control member for said first and second pumps.

5. A planetary gear type forward and backward drive switching apparatus, as defined in claim (4), wherein said clutch means comprises a sleeve type clutch slidable axially on said second transmission shaft and including a splne portion selectively engaging spline portions respectively of said carrier and said ring gear by the sliding movement.

6. A transmission for a vehicle having a planetary gear type forward and backward drive switching apparatus comprising;

vehicle propelling means including an axle and an axle drive mechanism, a first and second propelling line transmission shaft mounted in series and coaxially with each other for transmitting output of an engine to said vehicle propelling means, a PTO shaft positioned at a rear portion of the vehicle and connected at a front end thereof to a pinion gear of said axle drive mechanism, a main transmission unit disposed adjacent said first propelling line transmission unit disposed adjacent said second propelling line transmission shaft and PTO shaft rearwardly of said axle drive mechanism, a planetary gear type forward and backward drive switching device disposed between said main transmission unit and said vehicle propelling means, including;

a sun gear mounted on said first propelling line transmission shaft, a carrier supporting a plurality of planetary gears meshing with said sun gear, and rotatable about said transmission shafts, a ring gear meshing with said plurality of planetary gears and rotatable about the transmission shafts, friction brake means for selectively braking said carrier and said ring gear, said friction brake means including;

an annular main brake body having at least one face acting on lateral side faces of said carrier and said ring gear, and brake trigger means for operating said main brake body, said main brake body being shiftable axially along said transmission shafts for selectively braking said carrier and said ring gear, and clutch means including a main clutch body having an engaging member for selectively transmitting rotational outputs of said carrier and said ring gear to said second propelling line transmission shaft, said clutch means further including clutch trigger means for operating said main clutch body, and a forward and backward drive switching lever for operating said forward and backward drive switching apparatus, wherein said forward and backward switching lever is operatively connected to said brake trigger means and clutch trigger means, said brake trigger means acting of said main brake body so as to brake said ring gear, and said clutch trigger means concurrently acting on said main clutch body so as to operatively connect said carrier to said second transmission shaft in response to a displacement of said forward and backward drive switching lever, as a result of which a forward drive is produced, and said brake trigger means acting on said main brake body so as to brake said carrier, and said clutch trigger means acting on said main clutch body so as to operatively connect said ring gear to said second transmission shaft in response to another displacement of said forward and backward drive switching lever, as a result of which a backward drive is produced.

7. A transmission for a vehicle as claimed in claim 6 wherein the auxiliary transmission unit comprises;
a first and a second drive gear rotatable in unison with said second propelling line transmission shaft,
a first and a second driven gear relatively rotatably with said PTO shaft, said first and second driven gear including spline portion, and associated with said first and second drive gears, respectively, and
a change speed wheel member rotatable in unison with and slidable axially on said PTO shaft and including a spline portion for selectively engaging said spline portion of said first and second driven gears.

8. An apparatus as claimed in claim 7 wherein said carrier and ring gear include peripheral outer configurations substantially equidistant from an axis of siad transmission shafts, said main brake body being disposed between said carrier and said ring gear.

9. A transmission system for a vehicle, as defined in claim 8, wherein:
said brake means further including;
a hydraulic piston continous with said main brake body,
first and second oil chambers for said hydraulic piston, and
a hydraulic control mechanism for feeding oil into said first and second oil chambers to shift said hydraulic piston.

10. A transmission system for a vehicle, as defined in claim 9, wherein said hydraulic control mechanism includes first and second pumps respectively connected to said first and second oil chambers and said brake trigger means includes a rocking type pump control member for said pumps.

11. An apparatus as claimed in claim 10 wherein said clutch means is a sleeve type clutch rotatable in unison with and axially slidable on said second transmission shaft, and including a spline portion for selectively engaging said spline portion of said carrier and ring gear, respectively, said clutch trigger means being constructed as an oscillatable shifter for sliding said sleeve type clutch.

12. A transmission system for a vehicle, as defined in claim 11, further comprising another power takeoff shaft for directly taking out the output of the engine.

13. A transmission system for a vehicle, as defined in claim (12), wherein said first and second running line transmission shafts comprise hollow shafts through which said another power takeoff shaft extends.

14. A transmission system for a vehicle, as defined in claim (13), wherein said transmission system for a vehicle is mounted on a walking operator type tiller.

15. A transmission system for a vehicle, as defined in claim (14), wherein said axle transmission mechanism is a bevel gear mechanism.

16. A transmission system for a vehicle, as defined in claim (13), wherein said transmission system for a vehicle is mounted on an agricultural tractor.

17. A transmission system for a vehicle, as defined in claim (16), wherein said axle transmission mechanism is a differential mechanism.

* * * * *